US007110051B2

(12) United States Patent
Smadi et al.

(10) Patent No.: US 7,110,051 B2
(45) Date of Patent: Sep. 19, 2006

(54) DISPLAY METHODS FOR LIQUIDS HAVING OPTICAL EFFECTS

(75) Inventors: Raeda M. Smadi, Austin, TX (US); Curtis M. Elsik, Austin, TX (US); Samir S. Ashrawi, Austin, TX (US); George A. Smith, Austin, TX (US); Christopher J. Whewell, Georgetown, TX (US)

(73) Assignee: Huntsman Petrochemical Corporation, The Woodlands, TX (US)

( * ) Notice: Subject to any disclaimer, the term of this patent is extended or adjusted under 35 U.S.C. 154(b) by 405 days.

(21) Appl. No.: 10/791,946

(22) Filed: Mar. 3, 2004

(65) Prior Publication Data

US 2004/0186036 A1 Sep. 23, 2004

Related U.S. Application Data

(60) Provisional application No. 60/455,125, filed on Mar. 17, 2003.

(51) Int. Cl.
*G02F 1/13* (2006.01)
*C11D 17/00* (2006.01)

(52) U.S. Cl. ............................ 349/1; 349/96; 510/417

(58) Field of Classification Search .................... 349/1, 349/96, 167, 182, 193; 359/483, 485; 510/394, 510/406, 417, 419, 470
See application file for complete search history.

(56) References Cited

U.S. PATENT DOCUMENTS 5,696,074 A * 12/1997 Nickel et al. ............... 510/470
6,627,185 B1 * 9/2003 Kumar et al. ................. 424/73
2002/0097195 A1 * 7/2002 Frank ............................ 345/5

* cited by examiner

*Primary Examiner*—Toan Ton
*Assistant Examiner*—Tai Duong
(74) *Attorney, Agent, or Firm*—Ron D. Brown

(57) ABSTRACT

Provided herein are consumer products contained in conventional containers. A consumer product packaged according to the present invention is one which exhibits birefringence, and the packaging used according to the present invention is arranged so that the consumer product is caused to exist between two layers of polarizing film and is thus capable of exhibiting the phenomenon of birefringence to consumers under ambient lighting conditions.

15 Claims, 2 Drawing Sheets

DISPLAY METHODS FOR LIQUIDS HAVING OPTICAL EFFECTS

CROSS REFERENCES TO RELATED APPLICATIONS

This application claims the benefit of U.S. Provisional Application No. 60/455,125 filed Mar. 17, 2003 which is currently still pending.

TECHNICAL FIELD

The present invention relates to methods for displaying products. More particularly, it relates to methods for displaying liquid products which exhibit the phenomenon of birefringence. The display methods of the present invention are particularly well-suited for exhibiting multi-color effects of products which contain structured surfactants that exhibit bireflingence under polarized light.

BACKGROUND

Liquid consumer products including those such as soaps, cosmetics, shampoos, shower gels, cleansers, hand cremes, etc. have been known for quite some time. Most typically, such products contain one or more surfactants (anionic, non-ionic, and/or cationic) which exist in an isotropic phase, which phase by definition is recognized by those skilled in the art as being micellar in nature.

Under particular conditions, certain surfactants may exist in a lamellar, or liquid crystalline phase. One of the characteristics of a surfactant that exists in a lamellar phase is that it displays the phenomenon of birefringence when viewed under a polarized light source, which inherent feature is not exhibited by micellar-phase materials. Birefringence gives rise to a variety of colors in such lamellar liquids when viewed through a polarizing film.

SUMMARY OF THE INVENTION

The present invention provides packaging means which provide consumer products contained in a bottle, wherein the consumer product includes a surfactant that exists in a lamellar phase which exhibits birefringence, and wherein a portion of the consumer product is caused to be disposed between two sheets or panels of polarizing film, so as to display visual effects of birefringence to a person observing the bottle under ambient lighting conditions. The ambient lighting conditions may be enhanced in certain retail store settings by addition of bright lights and various backgrounds. The effect of two panels may be caused by a single continuous sheet of film in the form of a sleeve disposed about a bottle having a circular or other cross section which lends itself well to having a sleeve disposed about it.

DETAILED DESCRIPTION

Polarizing films are known in the art to comprise transparent films of polymeric material which only permit visible light in a single plane to pass through them. Such polarizing films are well-known in the art, and include such polarizing films as those sold by Edmund Scientific Supply of Barrington, N.J. Any polarized film which only permits visible light in a single plane to pass through them are suitable for use in accordance with the present invention.

According to the present invention, a surfactant product which exists in a lamellar state and which exhibits the phenomenon of birefringence is caused to exist between two sheets of a polarizing film. According to one preferred form of the invention, the liquid that displays birefringence is contained in a packaging container which is intended to be displayed on a store shelf, for causing enhanced appeal to consumers from the visual effects observable by virtue of the liquid that displays birefringence being disposed between two sheets of polarizing film.

Any liquid surfactant which contains a phase that exhibits birefringence (which word as used herein also includes "streaming birefringence" as specified by the IUPAC definition thereof) is suitable for packaging and being displayed according to the present invention. Suitable surfactant structured surfactants include, without limitation, those described in U.S. Pat. Nos. 4,618,446; 4,659,497; 4,692,271; 4,753,754; 4,793,943; 4,871,467; 5,039,451; 5,198,353; 5,442,113; 5,476,519; 5,498,791; 5,547,918; 5,807,810; 5,952,285; 5,964,692; 5,981,458; 6,090,762; 6,177,396; and 6,194,354, the entire contents of which each of these are herein incorporated by reference thereto.

Figure 1:
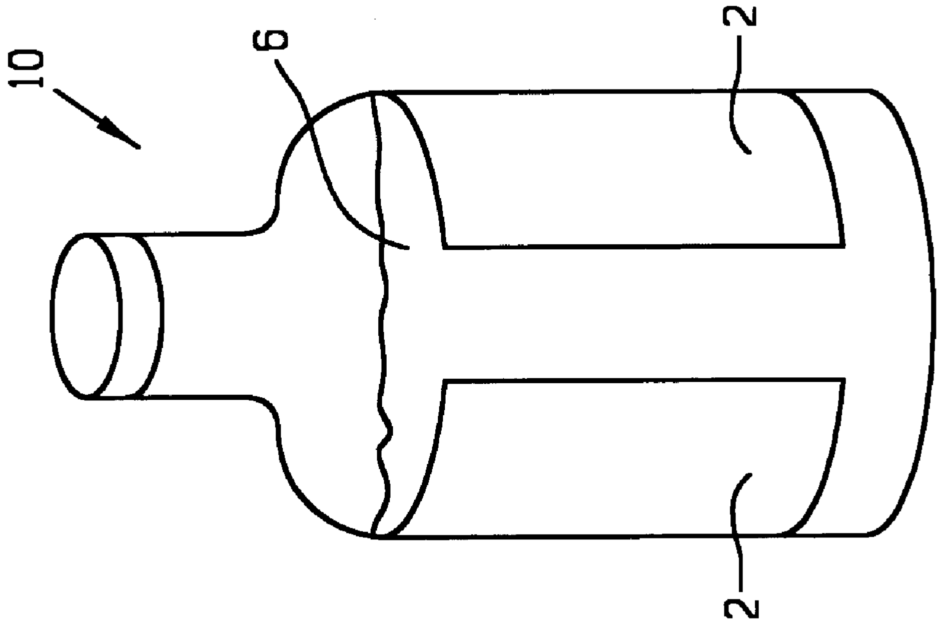
FIG. 1 is a side perspective view of a birefringent liquid being displayed in accordance with one form of the present invention.

Referring to the drawings and initially to FIG. 1 there is shown a packaged product 10 which includes a surfactant composition 6 which exhibits birefringence. Disposed on the outer surface of the container is a polarizing film 2, which may be comprised of a plurality of separate sheets, or of a single sheet. In the case of a single sheet, the single sheet may totally circumscribe the bottle, or may only cover a portion of the bottle. The polarizing material is preferably adhered to the outer surface of the bottle by means of an adhesive, as adhesives useful for adhering polymeric films to containers are well known in the art. According to an alternative form of the invention, the polarizing film is cast-in to the container during the manufacture of the container. According to a preferred form of the invention, the container comprises a polymeric material, such as polypropylene, polyethyleneterephthalate, or polyethylene, and including interpolymers or copolymers of either of the foregoing with one another or with other olefinic monomers.

Figure 2:
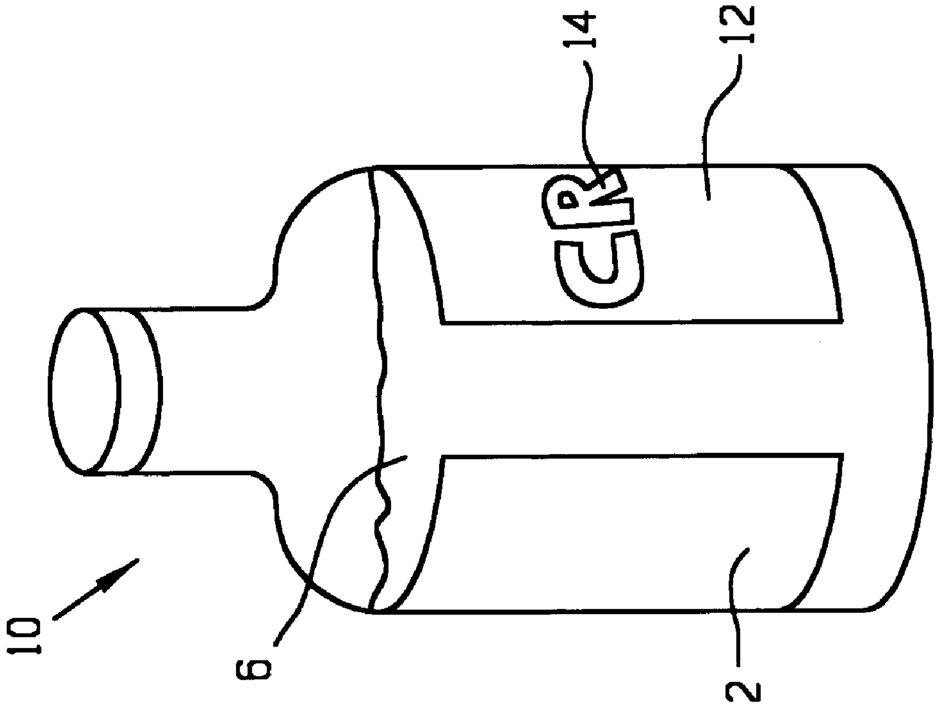
FIG. 2 is a side perspective view of a birefringent liquid being displayed in accordance with an alternate form of the present invention.

FIG. 2 illustrates an alternative form of the invention in which a surfactant composition 6 which exhibits birefringence is contained in a bottle having a front label 12 which comprises a polarizing film, and a rear label 2 which comprises a polarizing film, wherein the front label includes void areas, holes, perforations, or the like, such as the letters CR. In this embodiment, the liquid between the polarizing films exhibits a wide variety of colors and visual effects to the consumer owing to the birefringence phenomenon, and the cutouts where the letters occur stand out in contrast to the remaining portion of the front label by virtue of the lack of birefringence in these cutout areas defined by these letter shapes.

Figure 3:
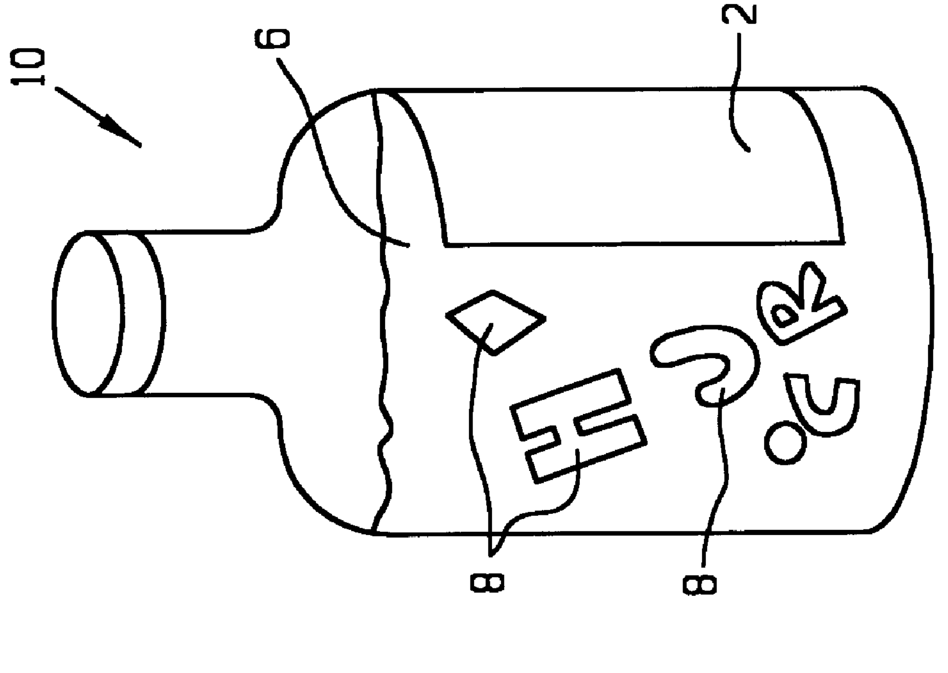
FIG. 3 is a side perspective view of a birefringent liquid being displayed in accordance with an alternate form of the present invention.

FIG. 3 illustrates an alternative form of the invention in which a surfactant composition 6 which exhibits birefringence is contained in a bottle having a label 2 which comprises a polarizing film. (A polarizing film used on a label on a bottle according to any of the various embodiments of the present invention may also contain various writings, as such labels are known to contain, such as listings of ingredients, company names, etc.). In this embodiment, there are also contained within the bulk of the liquid pieces of polarizing film 8 having various shapes, in suspended form. Such an arrangement places lamellar phase material 6 between polarizing films 2 and 8 and enables a consumer to observe a wide variety of color effects.

Figure 4:
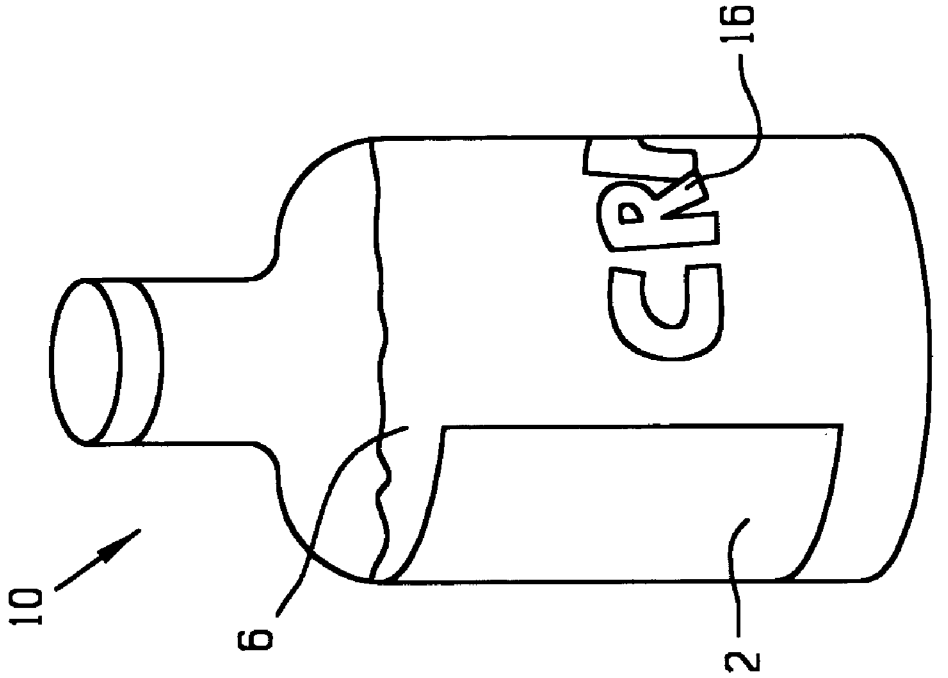
FIG. 4 is a side perspective view of a birefringent liquid being displayed in accordance with an alternate form of the present invention.

Yet another embodiment of the invention is illustrated in FIG. 4 in which a surfactant composition 6 which exhibits birefringence is contained in a bottle having a label 2 which comprises a polarizing film, and wherein the bottle also includes pieces of polarizing film 16 in the shapes of letters, or any other shape desired by the packager of the product, (including without limitation: animals, numbers, silhouettes of famous persons, religious symbolisms, trademarks, etc.) disposed on its outer surface (or integral with the bottle, as produced during bottle manufacture) so as to effectively dispose a birefringing liquid 6 between two sheets of polarizing film.

Any shape bottle is suitable for use according to the present invention, but the most preferred bottles are those which are circular or rectangular as viewed from above, owing, inter alia, to their popularity.

The present invention contemplates affixing the polarizing film on the interior of a container such as a bottle as well, for all embodiments of this invention wherein a polarizing film is disposed on the outer surface of a containing vessel, such as a bottle as aforesaid. Such interiorly-disposed film may also comprises various shapes desired by the user.

In addition to products which contain surfactants in a lamellar phase which exhibit birefringence which are useful in the personal care and cosmetics industry, the present invention contemplates packaging products for use in agrochemical market as well, including microemulsion formulations, chromatic emulsions and microemulsions, single component as well as combination package mixes.

The effect of using two panels of a polarized film in observing bireflingence according to the invention may be alternatively arrived at by using a single continuous sheet of film in the form of a sleeve disposed about a bottle having a circular or other cross section which lends itself well to having a sleeve disposed about it. In such a case, and similar ones, such as when a cylindrically-shaped bottle includes a sleeve of polarizing or polarized film disposed on its exterior, the birefringing material is thus effectively disposed between two layers, (which includes without limitation panes, panels, and sheets) and such configurations are functionally equivalent to those embodiments which employ two distinct or separate pieces of a polarizing or polarized film within the present invention. In each of the aforesaid, the birefringing material is disposed between two layers of polarizing or polarized film.

The present invention includes the use of structured surfactants as the consumer product which is contained in a vessel (bottle, jar, box). Suitable structured surfactants include those which include a water-soluble carbohydrate present in an effective amount so as to function as a structurant, as described below.

Structured Surfactants

The term “structured surfactant” as used herein means a pourable composition comprising water, surfactant, dissolved carbohydrate and any other dissolved matter, including any co-structurants, which together form a mesophase, or a dispersion of a mesophase in a continuous aqueous medium, and which has the ability to immobilise suspended particles while the structured surfactant is at rest, to form a pourable suspension.

The aqueous structured surfactants formed by the interaction of surfactants with carbohydrates include structured surfactants which are believed to be in the form of an expanded G-phase. In particular they include novel structured surfactants having a much wider repeat spacing than the typical electrolyte-structured expanded G-phases described in EP O 530 708, which is incorporated by reference herein. Structured surfactants useful in the present invention may comprise structures which typically show a repeat spacing between 20 and 50 nm which is approximately double the repeat spacings measured for electrolyte-structured expanded G-phase, and approximately four times the typical repeat spacing in a conventional binary surfactant/water G-phase. The following discussion is based on the assumption that the structure is lamellar. We do not, however, intend to exclude the possibility that the structured surfactant may comprise non-lamellar components.

Surprisingly, despite the apparently high lamellar spacing of the G-phases of the structured surfactants, they are generally robust with good suspending power and good temperature stability. Typically the viscosity increases slightly with increasing temperature and the structured surfactants are often stable up to 70° C. or higher.

The structured surfactants when fully de-aerated and free from suspended fine insoluble particles are generally obtainable in a substantially clear and transparent form in marked contrast to other structured surfactant structured surfactants. This can typically be achieved by vigorous centrifugal deaeration and/or by gentle heating at, e.g. 60 to 80° C.

If the amount of surfactant or of structurant is not sufficiently high, or the ratio of electrolyte to carbohydrate is too high, the structured surfactant will be obtained as an opaque two phase structured surfactant which may be spherulitic or comprise dispersed G-phase or batonettes.

The proportions vary depending on the nature of the surfactant and of the carbohydrate. The following typical proportions are expressed by weight of the total structured surfactant i.e. comprising the water, surfactant, structurant and any other dissolved matter but excluding any suspended solids or water-immiscible liquids.

Generally the surfactant is present in an amount of at least 2%, e.g. at least 5% especially more than 10%, by weight of the structured surfactant but preferably less than 60% e.g. less than 50%, especially less than 40% more especially less than 30%. A convenient range is 3 to 25% especially 4 to 12%.

Carbohydrate structurants are usually required in substantially higher proportions than would be required for an electrolyte structurant. Preferably in the absence of electrolyte, the carbohydrate is present in a proportion of at least 25% e.g. at least 30% and usually more than 40% by weight. Concentrations greater than 65% are usually avoided. Typically the carbohydrate is less than 60%, usually less than 55% by weight of the composition. When electrolyte is present the carbohydrate may be present in substantially lower concentrations as a costructurant. Such structured surfactants may be spherulitic but in the presence of more than about 10% sugar, do not tend to flocculate. The structured surfactants require the presence of the carbohydrate in order to form a structured suspending structured surfactant. Typically the less soluble the surfactant, the less carbohydrate is required.

The proportion of water is usually greater than 20% by weight, more commonly greater than 30%, typically greater than 40% of the structured surfactant, but is preferably less than 65% usually less than 60%, e.g. less than 55%.

One way of preparing suspending structured surfactants is to prepare a G or M phase aqueous surfactant and add sugar until the structured surfactant clears. The G or M phases are located using conventional means, as described for example in GB 2 013 235.

Suspending power may be quickly checked by shaking air into the sample and noting whether the bubbles remain suspended. Confirmation that the structured surfactant is a true structured surfactant and not merely a slowly separating structured surfactant may be obtained by allowing the sample to stand overnight at 50 or 60° C. If the dispersed phase has not separated out in that time, the structured surfactant may be assumed to be structured. It is generally found that mixtures of two G-phase structured surfactants according to the invention also form G-phases.

If in any case difficulty is encountered locating a sugar-structured phase, it is usually possible for resolve by adding a minor proportion based on the weight of sugar of a co-structurant has discussed below.

The preferred carbohydrates are mono and disaccharide sugars such as sucrose, glucose or fructose. Other sugars which can be used include mannose, ribose, galactose, allose, talose, gulose, idose, arabinose, xylose, lyxose, erythrose, threose, acrose, rhamose and cellobiose. The carbohydrate may be a tri- or tetra-saccharide or a water soluble polysaccharide such as soluble starch. The term "carbohydrate" as used here includes water soluble non-surfactant derivatives of carbohydrates such as carboxylic acids and their salts, e.g. gluconic acid, mannic acid, ascorbic acid and alginates or reduced sugars such as sorbitol, mannitol or inositol. The levels of carbohydrate are preferably sufficiently high to inhibit microbiological growth in the medium and preferably sufficient to act as an effective biodegradable, non-allergenic preservative for the composition, thereby obviating the need for less environmentally friendly additives.

Some surfactants, especially the more water soluble surfactants such as alkyl ether sulphates form the clear lamellar phase more readily in the presence of a co-structurant. The co-structurant is preferably an electrolyte. Any water soluble salt which tends to lower the solubility of surfactant in water may be used, such as sodium tripolyphosphate, sodium carbonate, sodium citrate, sodium chloride or the corresponding potassium or ammonium salts. Alkalis such as sodium or potassium hydroxide may also be used. Other structurants include polar water-immiscible solvents such as phenolethoxy ether or a terpene. water soluble mono and dihydroxy alcohols and ether alcohols such as glycerol, propylene glycol, ethylene glycol monomethyl ether and diethylene glycol monomethyl ether.

The co-structurant, if required, may in principal, be present in concentrations up to 30%, but is preferably less than 20% e.g. 0.1 to 15% by weight. Often traces of co-structurants e.g. 0.1 to 3%, typically 0.5 to 2.5% by weight based on the structured surfactant are sufficient, although higher concentrations can be present. For example in some perfumed structured surfactants, the solvent in the perfume may be sufficient to provide any desired co-structuring effect. We prefer that the proportion of costructurant be less than the proportion of carbohydrate, preferably less than half the proportion of carbohydrate, e.g. less than one quarter the proportion of carbohydrate. Large amounts of electrolyte are generally undesirable because they inhibit the formation of clear phases. Generally the co-structurant is present in proportions insufficient to form a stable structured surfactant in the absence of the carbohydrate.

The surfactant may be any surfactant, but preferably comprises non-ionic surfactants such as $C_{8-25}$ alkyl mono or di-ethenanolamides or 1 to 50 mole ethoxylates such as $C_{8-25}$ alcohol or fatty acid ethoxylates, alkyl amine ethoxylates, or glyceryl or sorbitan ester ethoxylates, or polyoxypropylene oxyethylene block copolymers. Ethoxylates typically contain from 2 to 40 eg. 3 to 30 especially 5 to 15 oxyethylene groups. Other non-ionic surfactants include alkyl polyglycosides, sugar esters or amine oxides. The non-ionic surfactants typically have a HLB of from 5 to 16, e.g. 6 to 15, especially 8 to 14, e.g. 10 to 12. However surfactants with HLB as low as 1 may be used.

The surfactant may optionally be or comprise an anionic surfactant such as an ether sulphate, an alkyl benzene sulphonate, an alkyl sulphate, alkane sulphonate, olefin sulphonate, sulphosuccinate, sulphosuccinamate, soap, sarcosinate, tauride, isethionate, alkyl phosphate, or alkyl ether carboxylate. In each case the surfactant comprises an 8 to 25 carbon alkyl group or alkenyl group or polypropyleneoxy group. Alkyl or alkenyl groups may be straight or branched chain, primary or secondary and preferably have from 10 to 20 eg. 12 to 14 carbon atoms. Ether groups may comprise glyceryl groups and/or 1 to 20 mol polyoxyethylene groups e.g. 2 to 10 mole. The anionic group is usually a sulphate or sulphonate group, but may also be for example, a phosphate, phosphonate or carboxylate group.

The counter ion of the anionic surfactant is usually sodium but may also be potassium, lithium, ammonium or, calcium or other alkali metal or alkaline earth metal.

The surfactant may be or may comprise an amphoteric surfactant such as betaine, sulphobetaine or phosphobetaine. Examples include fatty alkyl dimethyl betaines, alkyl amidopropyl betaines and immidazoline betaines.

The surfactant may, alternatively be or comprise a cationic surfactant such as a $C_{8-25}$ straight or branched alkyl or alkenyl or alkylphenyl tri $C_{1-4}$ alkyl or hydroxyalkyl ammonium salt, or di $C_{1-4}$ alkyl benzyl ammonium salt, or an $C_{8-20}$. alkyl or alkenyl amido amine.

The presence of electrolyte is not normally required for structuring but is generally tolerated if required for other purposes. We particularly prefer electrolyte-free or low electrolyte (e.g. 1 to 5% by weight) compositions for personal care applications or where clear formulations are required but can tolerate much higher levels, e.g. up to 20% or more if required. For example industrial cleaning formulations may require high levels of alkali such as sodium hydroxide, carbonate or silicate. The presence of builders such as citrate, potassium pyrophosphate, or sodium tripolyphosphate may also be tolerated. Electrolyte may contribute to the structuring of the composition, and may be desirable as a costructurant when very water soluble surfactants or surfactants of high HLB are used.

The packaged consumer product composition may contain suspended solid, liquid or gaseous particles. For instance the composition may contain suspended oil droplets. The oil is preferably a mineral oil (e.g. a low molecular weight petroleum oil) or a fatty glyceride or other ester such as lauryl acetate, a terpene oil such as limonene or a silicone oil. Mixtures of oils may be used. Particularly preferred are vegetable oils such as coconut, evening primrose, groundnut, meadow foam, apricot kernel, peach kernel, avocado, jojoba and olive oil. Oil soluble cosmetic or topical pharmaceutical ingredients may be dissolved in the oil including antiseptics, styptics, antidandruff agents such as zinc omadine (zinc pyrithione) and selenium disulphide, proteins, emollients such as lanolin, isopropyl myristate, glyceryl isosterate or propylene glycol distearate, dyes, perfumes and waxes. Water insoluble particulate solids may be suspended including exfoliants such as talc, clays, polymer beads, sawdust, silica, seeds, ground nutshells and dicalcium phosphate, pearlisers such as mica or glycerol or ethylene glycol di-stearate, glitter additives and sunscreens such as titanium dioxide. Porous particles (so called micro-sponges) containing absorbed active ingredients or gelatin or other microcapsules may also be suspended. Other active ingredients which may be suspended include insect repellents and topical pharmaceutical preparations, e.g. preparations for treatment of acne, fungicides for athlete's foot or ringworm or antiseptics or antihistamines. Pigments, such as the iron oxides, may also be added.

The structured suspending structured surfactants of the invention may be used to suspend builders such as zeolite or sodium tripolyphosphate, agricultural and horticultural pesticides, biocides for water treatment, cuttings or shale in drilling muds, antifoams, explosives, gums such as gum benzoin, guan acacia, gum tragacanth xanthan and guar gum, enzymes, flavouring and vitamin concentrates, calcium phosphate for toothpaste, pharmaceuticals, and machinery and cutting abrasives such as emery or diamond powder.

The composition may contain liquefied propellant gas dispersed in order to provide foams such as shaving foam, on release from a pressurized pack.

Compositions useful in accordance with the invention may be useful for suspending pearlising agents. Pearlisers are required as concentrates for incorporation into liquid formulations such as shampoos and toiletries to import a nacreous iridescence which is attractive to consumers, and can mask inhomogeneities in the formulations. Pearlisers typically comprise small, thin, transparent platelet crystals which can be suspended in a parallel configuration. When so suspended light falling on the crystals undergoes complex multiple reflections within the substrate similar to those which occur in a pearl and giving rise to similar optical interference effects. Natural pearls comprise alternate layers of calcium carbonate and protein. Artificial pearlisers which can be suspended include guanine/hypoxanthine crystals extracted from fish scales, mica, various salts of lead, zinc, mercury and bismuth (e.g. bismuth oxychloride), titanium oxide and various fatty acid derivatives such as magnesium stearate, coconut monoethanolamide, ethylene glycol distearate and ethylene glycol monostearate. Fish scale extracts are too expensive and the inorganic pearlisers are either too toxic for general use in toiletries e.g. lead, mercury, or relatively ineffective e.g. bismuth. The fatty acid derivatives are therefore now the most widely used pearlisers. In addition to the chemical nature and physical form of the pearliser the manner in which it is suspended has an important effect on its visual impact. Difficulty is sometimes encountered obtaining the desired effect when incorporating pearlisers into aqueous formulations. Conventional fatty acid derived pearlisers are supplied as solids which are usually added to a heated formulation above their melting point and recrystallised in situ. The conditions of crystallisation and especially the amount and nature of the agitation applied must be carefully controlled in order to obtain an acceptable result. This makes it difficult to obtain consistent effects and renders solid pearlisers inconvenient to use.

A packaged consumer product according to the invention may contain minor amounts of other ingredients such as dyes, perfumes, soil suspending agents or optical brighteners. Solvents such as ethanol or isopropyl alcohol ethylene glycol, isopropylene glycol, glycerol or water miscible glycol ethers such as ethylene glycol monomethyl ether, diethylene glycol monomethyl ether or polyethylene glycol, and hydrotypes such as $C_{1-6}$ alkyl benzene sulphonates or urea may be required for special applications, e.g. as perfume enhancers, but if not so required are generally undesirable and are preferably absent but may be tolerated in small amounts, preferably less than 10%, e.g. less than 5%, most preferably less than 2%.

Many fluid surfactant—containing products are purchased by the consumer on the basis of factors which include the appearance of the product. Detergents, shampoos, toiletries, soaps and other surfactant-based consumer products often depend upon appearance and packaging for at least part of their consumer appeal. Striped toothpaste, marbled soap and blue speckled detergent powder are well known examples of products whose successful promotion was based on a characteristically variegated appearance.

The vessel may be any jar, bottle, tube, sachet or other conventional container for surfactant based products. It may typically be of glass or plastic or other transparent material. It may be colored but is preferably at least partly clear to enable the decorative contents to be easily seen. It is possible to use deformable containers such as squeeze tubes or sachets, provided that they are sufficiently filled to give them a degree of rigidity enough to avoid loss of variegation on normal handling prior to use, but it is preferred to use rigid or at least substantially non-deformable materials.

The following examples illustrate structured surfactants which contain a water-soluble carbohydrate present as a structurant. In the following examples, all proportions are based on weight percentages of active ingredient based on the total weight of the composition, unless stated to the contrary.

EXAMPLES 1 to 4

The following formulations were prepared:

| | 1 | 2 | 3 | 4 |
|---|---|---|---|---|
| $C_{12-14}$ 3 mole ether sulphate | 10 | 12.5 | 15 | 17.5 |
| Sucrose | 46 | 46 | 46 | 46 |
| Trisodium citrate | 2 | 2 | 2 | 2 |
| Perfume | 5 | 5 | 5 | 5 |
| Water | balance | balance | balance | balance |

All four formulations were clear or slightly hazy, mobile structured liquids with good suspending properties. Suspensions of talc, mineral oil, pigment, small beads and plastic novelty items were prepared. All were stable after prolonged storage.

Each of the examples 1 to 4 was re-prepared (a) without the perfume (b) without the citrate and (c) without perfume or citrate. No suspending power was exhibited by any of the eight samples of preparations (a) and (c). The samples of preparation (b) all exhibited similar suspending power to the original examples. On heating the samples to 70° C. and subsequent cooling a clear transparent composition was obtained.

A clear sample of Example 1(b) and a sample containing a red pigment in suspension were slowly poured into a sample jar in a series of alternating additions. The effect was to produce a sequence of horizontal stripes. When the bottle was filled the stripes retained their integrity and showed no signs of blurring or diffusion after one year storage including intermittent periods of gentle shaking and six months weeks stored on its side.

EXAMPLE 5

A schematic phase diagram was prepared for the structured surfactant coconut diethanolamide/sucrose/water and is reproduced as FIG. 1 of the drawings. The area marked "clear lamellar" represents transparent expanded G-phases having a suspending power according to the invention, and the area marked "lamellar" comprises opaque expanded lamellar suspending structured surfactants according to the invention. The phase boundaries illustrated were not all precisely determined.

EXAMPLE 6

A sample was prepared comprising 10% coconut diethanolamide, 35% water and 55% sucrose. The product was a clear attenuated G-phase with good suspending power.

EXAMPLE 7

A composition comprising 10% $C_{12-14}$ alkyl 2 mole ethoxysulphate, 33% water, 50% sucrose, 5% ethanol based perfume, 2% sodium citrate gave a clear, attenuated G-phase with good suspending powers.

EXAMPLE 8

(Shampoo Formulation)

4 parts by weight of the composition of Example 7 and 1 part of the composition of Example 6 were mixed together to form a clear composition of the invention with good suspending powers and good performance as a skin cleanser and shampoo.

EXAMPLE 9

(Laundry Detergent Formulation)

| | % Active ingredient by weight |
|---|---|
| $C_{12-14}$ linear alkyl benzene sulphonate | 6.6 |
| Triethanolamine lauryl sulphate | 1.65 |
| $C_{12-14}$ alkyl 3 mole ethoxylate | 1.6 |
| Sucrose | 55.0 |
| Sodium diethlenetriamine pentakis (methylenephosphonate) | 0.55 |
| Water | balance |

The product was a hazy, readily pourable liquid with good suspending power.

EXAMPLE 10

(Pearl Concentrate)

A pearl concentrate was obtained by heating a formulation comprising 54% by weight sucrose, 10% by weight coconut di-ethanolamide, 10% by weight ethylene glycol distearate and 26% by weight water to 70° C. and cooling. A spontaneously pearly suspension was obtained.

EXAMPLE 11

10% by weight $C_{12-14}$ alkyl six mole ethoxylate (HLB=10), 54% by weight sucrose and 36% by weight water, were mixed and warmed to 70° C. The cooled product was a clear transparent, pourable structured surfactant with good suspending properties.

EXAMPLE 12

| | % w/w |
|---|---|
| sucrose | 40.0 |
| perfume | 2.0 |
| sodium $C_{12-14}$ alkyl 3 mole ethoxy sulphate (70%) | 8.0 |
| coconut diethanolamide | 2.0 |
| sodium chloride | 5.0 |
| water | balance |

The above formulation provided a clear, transparent, pourable fluid. Whorls of three different colored pigments were introduced into this formulation with a syringe. After three months no diffusion of the pigment was observable.

EXAMPLE 13

| | % w/w |
|---|---|
| sucrose | 40.0 |
| perfume | 2.0 |
| trisodium citrate dihydrate | 2.0 |
| sodium $C_{12-14}$ alkyl 3 mole ethoxy sulphate (70% by wt active) | 8.8 |
| glycamate | 5.06 |
| coconut monoethanolamide | 1.1 |
| coconut amido propyl betaine | 4.18 |
| sodium $C_{8-10}$ alkyl polyglycoside dp 1.6 (65%) | 6.2 |
| sodium chloride | 0.66 |
| sodium ethylene diamine tetraacetate | 0.05 |
| water | balance |

The composition was a pourable, clear, transparent fluid with suspending properties. A plurality of coloured, polystynene beads (1 mm diametre) were dispersed in the composition. The suspension remained stable after three months.

EXAMPLE 14

| | % w/w |
|---|---|
| sodium $C_{12-14}$ alkyl (3 mole ethoxy sulphate) | 10.0 |
| coconut diethanolamide | 2.5 |
| fructose | 50.0 |
| water | balance |

The above composition was a clear isotropic $L_1$ micellar solution which was unsaturated and had no suspending power. Addition of 6% by weight sodium chloride, gave a stable, easily pourable fluid, composition which after shaking was capable of suspending air bubbles. The aerated composition was stood overnight at 50° C. The aged composition was clear and transparent and maintained the air bubbles in a stable suspension. Equivalent compositions with 2 and 4% respectively of sodium chloride were not able to suspend bubbles under the foregoing conditions.

EXAMPLE 15

| | % w/w |
|---|---|
| sodium $C_{12-14}$ alkyl-3 mole ethoxy sulphate | 8.0 A.I. |
| coconut diethanolamide + 10% by wt glycerol | 2.0 A.I. |
| fructose | 40.0 |
| water | balance |

The above composition was not capable of maintaining particles in suspension. Addition of incremental amounts of sodium chloride gave the following results:

| wt % sodium chloride | |
|---|---|
| 2 | L1 phase bubbles rise |
| 4 | L1 phase bubbles rise |
| 6 | clear suspending phase. Bubbles suspended after aging at 50° C. overnight. |

Thus, it is seen that a wide variety of structured surfactants are suitable for use as a packaged consumer product in accordance with the present invention.

Consideration must be given to the fact that although this invention has been described and disclosed in relation to certain preferred embodiments, obvious equivalent modifications and alterations thereof will become apparent to one of ordinary skill in this art after reading and understanding this specification and the claims appended hereto. This includes the subject matter defined by any combination of any one of the various claims appended hereto with any one or more of the remaining claims. This includes the incorporation of the features of claim 13 (or any other dependent claim, singly or in combination with other dependent claims) into claim 1, with the remaining dependent claims in their original text being read and applied to such a modified claim 1. The presently disclosed invention is intended to cover all such modifications, alterations, and permutations.

What is claimed is:

1. A packaged consumer product contained in a vessel having an inner surface and an outer surface, wherein the consumer product includes a surfactant that exists in a liquid crystalline phase capable of exhibiting optical birefringence, and wherein a portion of the consumer product is effectively disposed between two layers of light-polarizing film, so as to enable observation of the visual effects of birefringence to a consumer when said packaged consumer product is disposed in a selected retail setting.

2. A product according to claim 1 wherein the lighting within said retail setting is the lighting normally encountered in retail settings of the type selected.

3. A product according to claim 2 wherein the lighting within said retail setting is augmented by additional lighting over the lighting normally encountered in retail settings of the type selected.

4. A packaged consumer product according to claim 1 wherein at least one of said layers of polarizing film is disposed on the outer surface of said vessel.

5. A packaged consumer product according to claim 1 wherein at least one of said layers of polarizing film is disposed on the inner surface of said vessel.

6. A packaged consumer product according to claim 1 wherein said vessel includes a polarized film disposed on its outer surface and a plurality of individual pieces of A polarized film suspended within the bulk of said surfactant contained within said vessel.

7. A packaged consumer product according to claim 4 wherein said polarized film includes voids in the shapes of numbers, letters, animal figures, trademarks, or religious symbols.

8. A packaged consumer product according to claim 5 wherein said polarized film includes voids in the shapes of numbers, letters, animal figures, trademarks, or religious symbols.

9. A packaged consumer product according to claim 4 wherein said polarized film exists in the shape of numbers, letters, animal figures, trademarks, or religious symbols.

10. A packaged consumer product according to claim 5 wherein said polarized film exists in the shape of numbers, letters, animal figures, trademarks, or religious symbols.

11. A packaged consumer product according to claim 1 wherein said two layers of polarizing film are oriented to pass light in the same plane.

12. A packaged consumer product according to claim 1 wherein said two layers of polarizing film are not oriented to pass light in the same plane, but are disposed such that the planes of each through which light is permitted to pass is any degree between 0 degrees and 90 degrees with respect to one another.

13. A packaged consumer product according to claim 1 wherein said consumer product is a structured liquid surfactant comprising a water-soluble carbohydrate present in an effective amount so as to function as a structurant in the consumer product.

14. A packaged consumer product according to claim 1 wherein said consumer product is packaged for retail sale.

15. A method for displaying optical birefringence in a retail product within a retail setting which comprises: a) providing a product contained in a vessel labeled for retail sale, said vessel having an inner surface and an outer surface, said product including a liquid crystalline phase surfactant which exhibits optical birefringence, and wherein said vessel is configured so that a portion of said product contained within said vessel is effectively disposed between two layers of light-polarizing film; and b) providing light to impinge upon said vessel.

* * * * *